(12) United States Patent
Fagin et al.

(10) Patent No.: US 6,686,579 B2
(45) Date of Patent: Feb. 3, 2004

(54) DIGITAL PEN USING SPECKLE TRACKING

(75) Inventors: Ronald Fagin, Los Gatos, CA (US); Nimrod Megiddo, Palo Alto, CA (US); Robert John Tasman Morris, Los Gatos, CA (US); Hal Jervis Rosen, Los Gatos, CA (US); Sridhar Rajagopalan, San Jose, CA (US); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 09/557,579

(22) Filed: Apr. 22, 2000

(65) Prior Publication Data

US 2003/0106985 A1 Jun. 12, 2003

(51) Int. Cl.[7] .............................................. H01L 27/00
(52) U.S. Cl. ..................... 250/208.1; 345/180; 345/181; 345/182; 345/183
(58) Field of Search ......................... 250/208.1, 227.13, 250/201, 222.1, 227.11; 345/180, 181, 182, 183

(56) References Cited

U.S. PATENT DOCUMENTS

| | | | | |
|---|---|---|---|---|
| 5,581,783 A | * | 12/1996 | Ohashi | ....................... 395/825 |
| 5,627,349 A | * | 5/1997 | Shetye et al. | .................. 178/18 |
| 5,652,412 A | * | 7/1997 | Lazzouni et al. | ............. 178/18 |
| 5,793,357 A | * | 8/1998 | Ivey et al. | ................... 345/166 |
| 6,278,440 B1 | * | 8/2001 | Katsurahira et al. | ..... 178/18.07 |
| 6,282,315 B1 | | 8/2001 | Boyer | ......................... 382/177 |

* cited by examiner

Primary Examiner—Edward J. Glick
Assistant Examiner—Courtney Thomas
(74) Attorney, Agent, or Firm—John L. Rogitz

(57) ABSTRACT

A digital pen that has an ink writing tip includes a laser on a pen body that directs light toward paper across which the writing tip is stroked. A CMOS camera or CCD is also mounted on the pen body for detecting reflections of the laser light, referred to as "speckles". A processor in the pen body determines relative pen motion based on the speckles. A contact sensor such as an FSR on the pen body senses when the tip is pressed against the paper, with positions being recorded on a flash memory in the pen body when the contact sensor indicates that the pen is against the paper. The memory can be later engaged with a handwriting recognition device to correlate the positions to alpha-numeric characters. Ordinary paper can be used, but, if desired, special bar-coded paper can also be used, so that the recorded positions can be tagged with a page number, form field, and absolute position on the page.

14 Claims, 7 Drawing Sheets

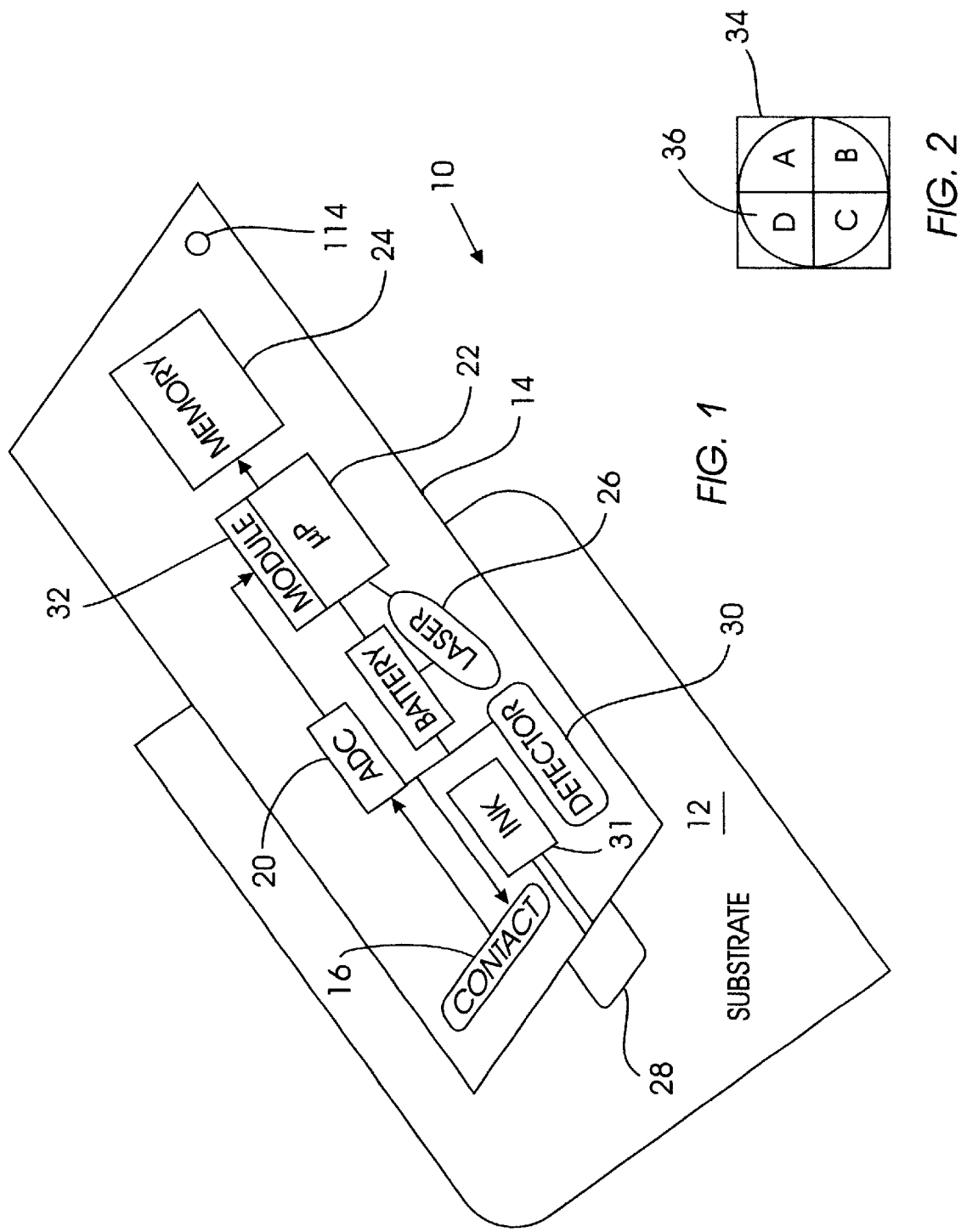

FORM 1630 first name    last name         —104
[          ] [            ]—106
street address
[                        ]
city, state, zip code
[                        ]
birth    eyes    weight
[    ] [    ] [     ]

| Page 21 |
|---|
| #1 |
| #2 |
| #3 |
| New |
| Undo |
| Done |
| Email |
| Fax |
| Name |
| Company |
| Address |
| email |
| Phone # |
| Day |
| Time |
| Subject |
| Call |
| Drawing |
| Expense |
| Notes |
| Order |
| Personal |
| Project |
| To Do |
| Urgent |

Tim Smith

*FIG. 8*

DIGITAL PEN USING SPECKLE TRACKING

BACKGROUND OF THE INVENTION

1. Field of the Invention

The present invention relates generally to handwriting data entry, and more particularly to methods and systems for facilitating data entry using a pen input device.

2. Description of the Related Art

Digital writing instruments, interchangeably referred to herein as "digital pens" regardless of whether they write in ink, can be used to capture pen strokes on paper and digitize them, so that the pen strokes can be converted by handwriting recognition software to a digitally-stored record of the writing. In this way, a laborious, tedious step in modern written communication, namely, the manual transcribing of handwriting into a computerized word processor, is eliminated, greatly increasing productivity.

Accordingly, digital pen systems can digitize pen strokes across a substrate, by sensing, in some fashion, the time-dependent position of the pen and converting the positions to pen strokes, for input of digital representations of the pen strokes to a handwriting recognition device. As recognized herein, magnetic-type systems can be used in which a special pen generates or alters a magnetic field as it is moved across a piece of paper, with the field being sensed by a special pad over which the paper is placed. Similarly, ultrasonic systems can be used in which a special pen generates or alters an ultrasonic signal as the pen is moved across a piece of paper, with the signal being sensed by a special pad over which the paper is placed.

As another alternative, as disclosed in co-pending U.S. patent application Ser. No. 09/226,778, filed Jan. 7, 1999 and assigned to the same assignee as is the present application, a conventional pen can be moved across a special substrate to alter an electric field, with the field anomalies caused by the pen movement being sensed and correlated to pen positions.

As recognized by the present invention, all of the above-mentioned systems require special pads to sense pen or stylus motion. As further recognized herein, it is desirable to enable a writer to write characters on a conventional paper substrate while recording pen motion without requiring the use of a special underlying pad and without requiring the use of special paper, so that the user can write on any convenient substrate without having to transport and use a relatively bulky pad. The present invention moreover recognizes that it is desirable to provide a system that can, but not must, use special paper for particular applications.

SUMMARY OF THE INVENTION

A digital pen includes an elongated body defining a writing tip, and a laser is oriented on the body to direct light onto a substrate against which the writing tip is positioned. The pen also includes a detector that receives interference patterns of light ("speckles") generated by the laser and reflected by the substrate. A contact sensor is supported by the pen body, and the contact sensor outputs a contact signal that represents whether the writing tip is positioned against the substrate. Also, a processor receives signals from the detector and in response thereto outputs position signals representative of positions of the pen.

In a preferred embodiment, the detector, processor, and a memory are all supported by the pen body. The memory stores position signals from the processor, such that the position signals later can be retrieved from the memory and processed by a handwriting recognition module to render signals representing alpha-numeric characters. Preferably, the processor sends position signals to the memory only when the contact signal indicates that the writing tip is positioned against the substrate, so that when a writer lifts the pen from the substrate, the pen position can be tracked but position signals are not recorded.

If desired, the substrate can include optical codes that are detectable by the detector. The codes represent at least positions, and the detector outputs at least one code signal in response to detecting an optical code. Furthermore, the detector outputs at least one speckle signal and the processor uses code signals and speckle signals to generate absolute position signals. The absolute position signals represent a pen position relative to at least one dimension defined by the substrate. Additionally, the optical codes can represent data including form entry fields.

In another aspect, a digital input device includes an elongated body defining a distal tip, and at least one laser is oriented on the body to direct light toward the vicinity of the distal tip. At least one detector is oriented on the body to receive reflections of laser light from a substrate against which the distal is from time to time positioned. Moreover, at least one contact sensor is provided on the body, and at least one processor is also on the body. As set forth further below, the processor communicates with the detector and the contact sensor.

In still another aspect, a processor is supported by an elongated writing implement, and the processor receives digitized representations of speckle frames that are generated by a detector on the body as the writing implement is moved against a substrate. The processor includes logic to convert the speckle frames to position signals representing positions of a distal tip of the writing implement. In accordance with the present invention, the logic includes comparing at least one current speckle frame to at least one previous speckle frame to render a pen position.

Thus, the invention can include a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein.

In yet another aspect, a processor that is supported by an elongated writing implement receives a digitized representation of optical reflectivity of a substrate generated by a light detector on the body as the writing implement is stroked across a substrate. The substrate includes preprinted optical codes to provide position information and visible tags viewable to the writer. In a preferred embodiment, tag processing means categorizes writing during or after handwriting capture. The tags can include at least one tag function or category chosen from the group including new, undo, done, email, fax, name, address, company, phone number, fax number, day, time, subject, drawing, call, expense, notes, project, order, personal, to do, and urgent. With this in mind, the tag processing means includes logical means to cause fax or email transmissions of categorized handwriting.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic view of the pen input system of the present invention;

FIG. 2 is a schematic view of a program storage device;

FIG. 8 is a view of an alternate form, illustrating how a user can indicate that a particular alpha-numeric string is to be correlated to a particular field on the form.

DETAILED DESCRIPTION OF THE PREFERRED EMBODIMENTS

Figure 3:
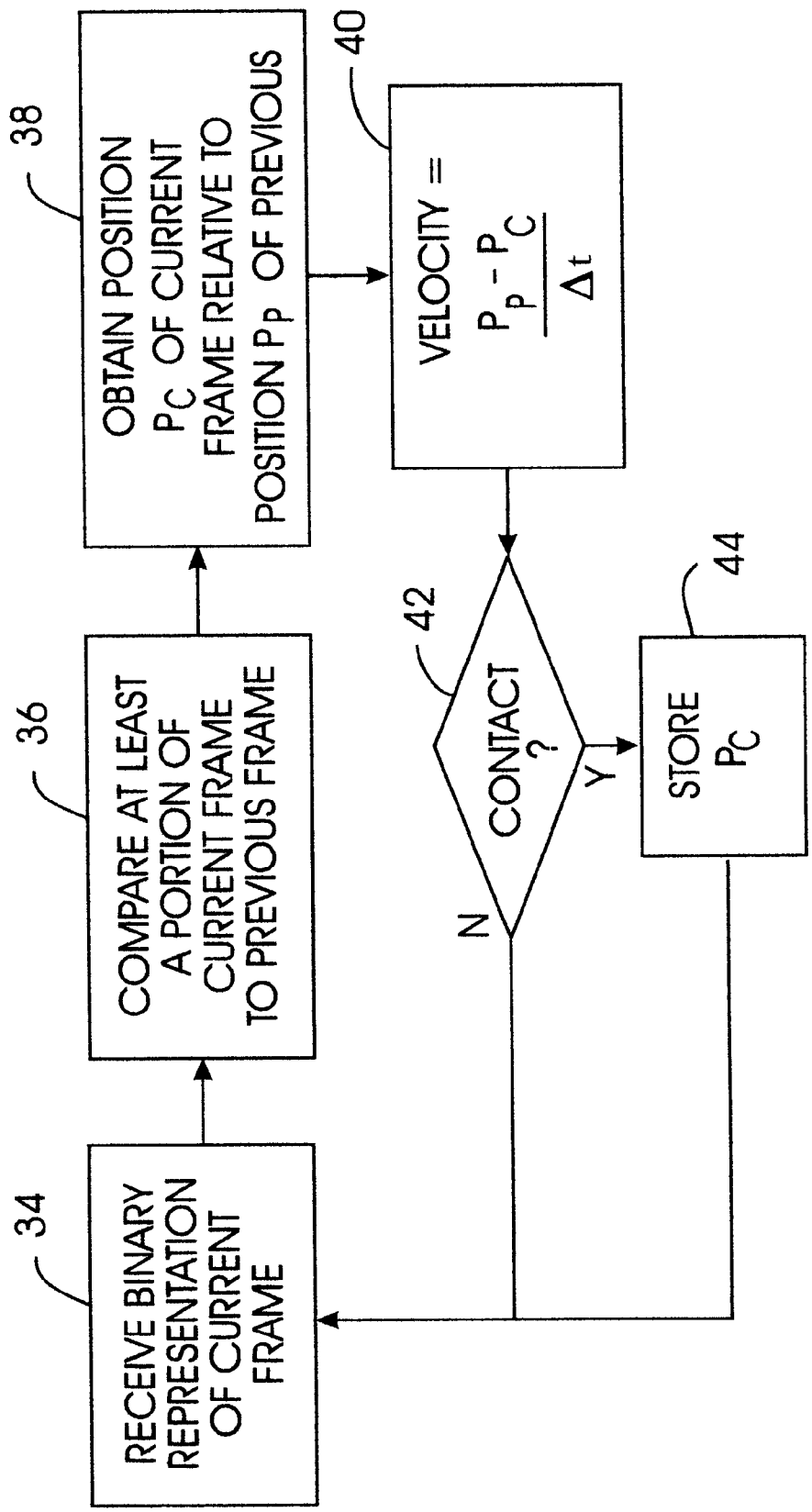
FIG. 3 is a flow chart showing the overall logic by which pen position signals are generated based on movement of a pen across the substrate.

Referring initially to FIG. 1, a pen input device is shown, generally designated 10, which includes a substrate 12 and at least one lightweight elongated hollow plastic or metal pen body 14. The preferred embodiment set forth herein contemplates a pen body 14 that can be manipulated by a writer to write ink or graphite or other substance onto a substrate 12 such as paper, while digitally recording strokes across the substrate 12. It is to be understood, however, that the principles advanced herein can be used with a pen body 14 that is a stylus-type device that does not necessarily deposit ink or other substance onto a substrate.

A contact sensor 16 can be supported on the pen body 14, for purposes to be shortly disclosed. The contact sensor can include, e.g., force sensing resistors or other force sensors. The contact sensor is energized by a dc power supply 18, preferably a type AAA Nickel Metal Hydride rechargeable battery with voltage step-up electronics, with the signals from the contact sensor 16 being sent to an analog to digital converter (ADC) 20. Or, the power supply 18 could be an alkaline battery or other equivalent source. Digitized signals from the ADC 20 are sent to a digital processor 22, which selectively stores pen position information in a digital memory 24. Signals stored in the memory 24 indicate the position of the tip 28, such that the signals can be transferred to a PC-based handwriting recognition engine for correlation of the position signals to alpha-numeric characters. The handwriting recognition engine can be any suitable handwriting recognition system, such as those disclosed in U.S. Pat. Nos. 5,644,652, 5,343,537, or 5,550,931, all owned by the present assignee and all incorporated herein by reference. The power supply 18, ADC 20, processor 22, and memory 24 are all mounted on the pen body 14 as shown.

In accordance with the present invention, the power supply 18 also energizes a laser 26 that is mounted on the body 14. Preferably, the laser 26 is an infrared (IR) laser. As can be appreciated in reference to FIG. 1, the laser 26 is oriented on the body 14 such that it directs a laser beam toward the vicinity of a distal writing tip 28 of the pen body 14, such that a three dimensional interference pattern is generated when the coherent laser light reflects off the texture of the substrate 12. The interference pattern is referred to herein as "speckles". As contemplated hereunder, the speckles are detected by a detector 30, also mounted, in the preferred embodiment, on the body 14. In the preferred embodiment the detector 30 is a lensless CMOS imaging sensor array or CCD. The signal from the detector 30 is digitized by the ADC 20 or by a separate ADC (not shown), with the digitized signal then being sent to the processor 22.

In continued reference to FIG. 1, in the preferred embodiment ink is deposited on the substrate 12 as the writing tip 28 is moved against the substrate 12. Accordingly, an ink supply 31 is mounted on the body 14 in communication with the writing tip 28. Alternatively, the writing tip 28 can deposit graphite or other substance on the substrate 12.

In one preferred embodiment, the detector 30 is a Mitsubishi M64282FP Image Sensor with a window of 128×128 pixels, the memory 24 is a four megabyte flash memory chip, the processor 22 is a Scenix 8 bit RISC processor chip, and the laser 26 pulses beams at a pulse frequency of 500 Hertz for a preferred resolution of 256 dots per inch or 512 dots per inch. The laser is pulsed to conserve power. More specifically, the laser is energized as the camera is integrating the speckle pattern, and is deenergized while the image is converted to a digital signal and processed.

In accordance with the present invention, the processor 22 accesses a software or firmware position module 32 to correlate the signals from the ADC 20 to position signals representative of the position of the writing tip 28 relative to the substrate 12. These signals are then sent to the handwriting recognition engine mentioned above for reduction of the position signals to alphanumeric characters.

It is to be understood that the processor of the present invention can be a general purpose computer appropriate for its intended function and programmed to undertake appropriate method steps set forth herein. For example, the processor 22 can be a digital signal processor such as Analog Devices ADSP2104L, or a field programmable logic array such as a Xilinx XC2S39, or an ASIC. Alternatively, the processor 22, module 32, and memory 24 can be located outside the pen body 14 and remotely linked to the detector 30, ADC 20, and laser 26 by radio waves, ultrasonic waves, IR link, or other remote means. The processor 22, module 32, and memory 24 can be included in a desktop computer, laptop computer such as a Thinkpad® made by International Business Machines Corporation (IBM) of Armonk, N.Y., or a personal digital assistant such as a 3COM Palm Pilot®, or a video game such as a Sony Playstation or Sega Dreamcast®.

It is to be further understood that the control components such as the module 32 are executed by logic components such as are embodied in logic circuits on, e.g., an ASIC chip, or in software contained in an appropriate electronic data storage, e.g., random access memory (RAM), or hard disk drive and/or optical disk drive, or DASD array, magnetic tape, electronic read-only memory, or other appropriate data storage device that is conventionally coupled to the processor 22 for executing the module 32. For example, the control components can be embodied in a flash memory 34 shown in FIG. 2. The diskette 34 shown in FIG. 2 has a computer usable medium 36 on which are stored computer readable code means (i.e., program code elements) A–D.

The flow charts herein illustrate the structure of the present logic. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. In other words, the module 32 may be a computer program that is embodied in software or firmware and that is executed by a processor as a series of computer-executable instructions. In an illustrative embodiment of the invention, the computer-executable instructions may be lines of compiled C++ compatible code.

FIG. 3 shows the computer-implemented method of the present invention. Commencing at block 34, a binary representation of the speckles of the current frame imaged by the detector 30 is received by the processor 22. Moving to block 36, the current frame or a portion of it is compared as discussed in greater detail below with the previous frame. Proceeding to block 38, the position $p_c$ of a predetermined point, e.g., the center, of the current frame is determined relative to the position $p_p$ of the predetermined point of the previous frame. In other words, the position of the speckle pattern is tracked as an analog to tracking the position of the writing tip 28.

Preferably, the logic next determines a pen velocity at block 40 as being the ratio of the difference between the current and previous positions to the elapsed time $\Delta t$ (the inverse of the frame update rate) between frames, for purposes to be shortly disclosed. Then, at decision diamond 42 it is determined whether the writing tip 28 is in contact with the substrate 12, based on the signal from the contact sensor 16. If it is, the current position is stored in memory 24 at block 44. From block 44, or from decision diamond 42 when the contact sensor 16 does not indicate contact (indicating that the writer has lifted the pen from paper to, e.g., cross a "t" or dot an "i"), the logic loops back to block 34.

Figure 4:
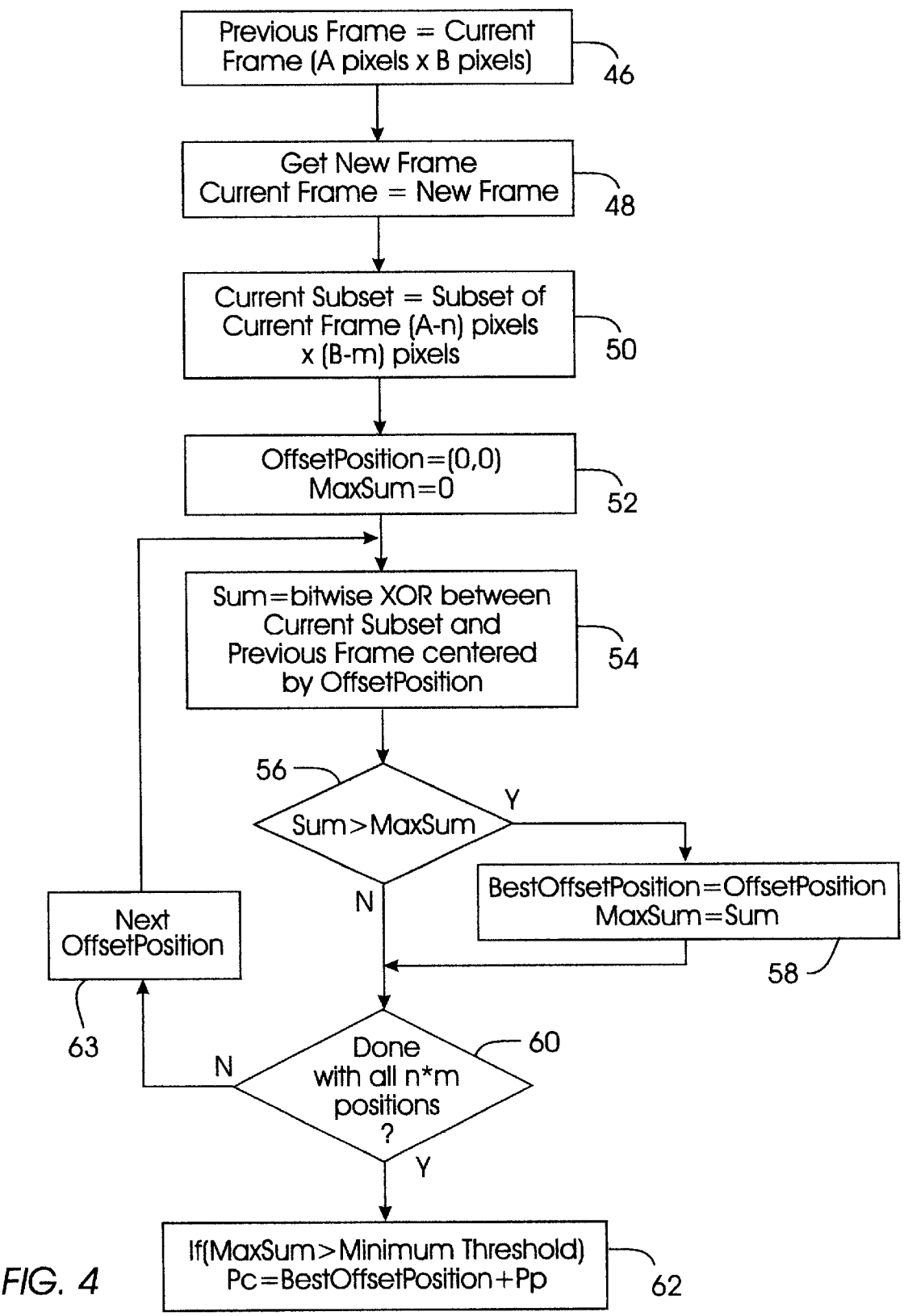
FIG. 4 is a flow chart showing the preferred position logic.

FIG. 4 shows the details of the position comparison logic referred to above. Commencing at block 46, the current frame, which is a matrix of binary numbers having dimension A×B and representing a speckle pattern, is defined to be the previous frame. A new frame is obtained at block 48 and defined to be the current frame. Next, at block 50, a subset of the current frame is established having dimensions (A−n)×(B−m). In the preferred embodiment, A and B are equal to forty (40), n and m are equal to eight (8), and the center of the current frame subset is superimposed on the center of the previous frame, such that the previous frame overlaps the current frame subset by four pixels at each edge.

Figures 5, 7:
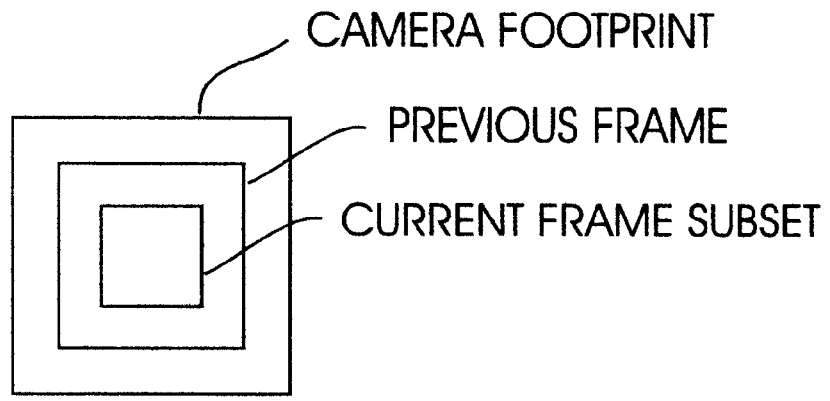
FIG. 5 is a schematic diagram showing a subset of a current frame superimposed on a previous frame.
FIG. 7 is a top plan view of a preprinted form.

FIG. 5 illustrates the exemplary embodiment discussed above. As shown, to speed processing time the previous frame size can be less than the full camera footprint, and the current frame subset is smaller than the previous frame. It will be appreciated in reference to FIG. 5 that when the previous frame is 40×40 pixels and the current frame subset is 32×32 pixels, there are 64 possible pixels of the previous frame on which the current frame can be placed without falling outside the boundary of the previous frame. Stated another way, the center of the current frame subset can be offset to one of 64 positions and still completely overlap the previous frame.

With this explanation in mind, the logic moves from block 50 to block 52, wherein for potentially each of the possible sixty four offset positions a DO loop is entered. It is to be understood that for the current frame the brightness level of each pixel is converted to a binary value, in a preferred embodiment, by comparing the pixel brightness level to the average brightness level of pixels occurring in a row.

At block 54, the correlation of the previous frame to the current frame subset is calculated as the sum of the bitwise XOR between the binary values of the pixels of the previous frame and the current frame subset, wherein the center of the current frame subset is offset by the variable OffsetPosition. The variable OffsetPosition moves the current frame subset through each of the possible n*m positions, starting at (0,0) in block 52 and ending with (n,m), tested at decision diamond 60. As can be appreciated in reference to FIG. 4, decision diamond 56 and block 58 cooperate to save the OffsetPosition of the best correlation (the best match), identified by the largest sum. A perfect sum for a 32×32 matrix would be a value of 1,024, and one preferred minimum threshold could be, e.g. 973, representing a 95% bitwise correlation. Other values can be selected if desired.

If the sum exceeds an acceptable threshold, tested in block 62, the OffsetPosition for the greatest sum determined in block 58 is saved as the incremental movement of the pen tip 28 from the previous frame. New position of the pen tip 28 Pc is the previous position Pp plus the incremental movement OffsetPosition, as shown at block 62. In a preferred embodiment, the OffsetPosition is saved in memory 24. Block 63 simply shows the DO loop returning to block 54 when all positions have not yet been tested.

As mentioned above, the extrapolated pen velocity determined at block 40 in FIG. 3 can be used to realize processing efficiencies. Specifically, the position of the current frame can be extrapolated prior to executing the bitwise XOR logic by multiplying the velocity by the time between frames to render a distance differential, and then applying the distance differential to the previous frame position to render a extrapolated current frame position. The process beginning at block 52 can then be started commencing at the projected current frame position. Advantageously, this puts the current frame subset in the neighborhood of highest correlation, since the frame rate (typically 100 Hz or greater) is greater than the rate of change of pen movement (typical under 10 Hz). This in turn allows the current frame subset to lie outside the previous frame rate, increasing the velocity and spatial dynamic range of the system. Another benefit is not all n*m correlation calculations need to be performed. Because the current frame subset in the neighborhood of highest correlation, the loop can work a pattern that spirals out from the extrapolated position and decide on a correlation that both exceed the threshold and is a local maxima.

It may now be appreciated that because laser speckles are tracked as an analog to tracking the position of the writing tip 28, and that because any paper substrate will produce speckles, no special paper or underlying pad need be used with the device 10. That is, the substrate 12 can be a plain piece of paper. Only a special pen device 10 is required to achieve digital input by storing positions in the memory 24 and later downloading data in the memory 24 to a handwriting recognition module.

Figure 6:
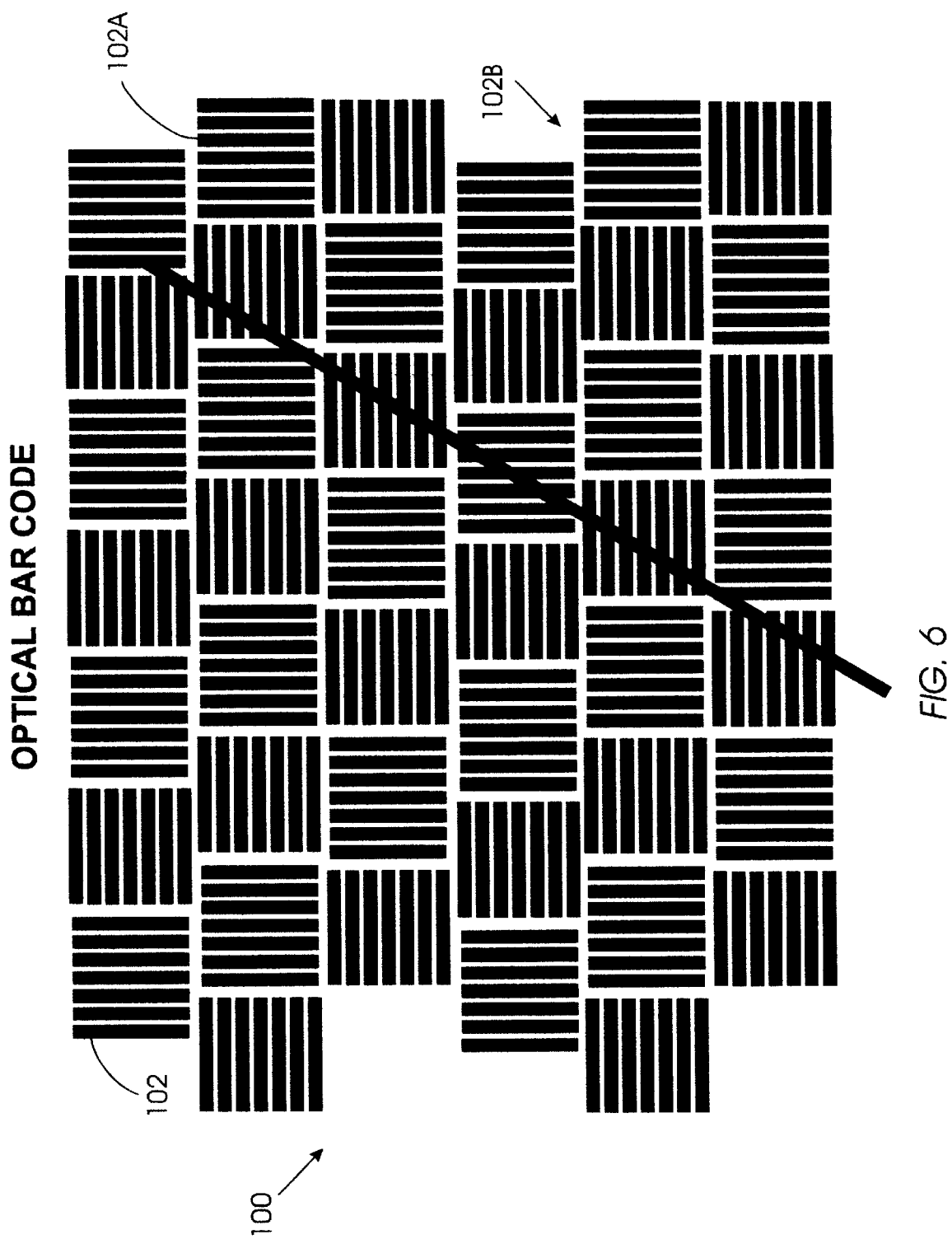
FIG. 6 is a schematic diagram of a bar-coded form, showing bar codes that would be invisible to the human eye.

Nonetheless, the present invention also envisions use of special paper to add further functionality. FIG. 6 shows a paper substrate 100 that has been preprinted with bar codes 102, i.e., bar codes printed in invisible, IR-absorbing ink. While the lines representing the bar codes 102 in FIG. 6 appear to have identical widths, it is to be understood that the widths of the bar codes 102 can be arranged to uniquely identify an absolute position in Cartesian coordinates on the paper substrate 100 each quarter inch, along with a page number and, in the case of forms disclosed further below, a field location. Moreover, as contemplated herein successive groups of bar codes are orthogonal to each other as shown, so that if one orientation is nearly parallel to the path of pen 10 movement resulting in a poor read, the subsequent pattern will be more easily read.

The term "bar code" is a generic term for optical marks on a substrate that spatially encode digital information. The optical marks cause modulation of reflected light that is detected by a detector which converts light intensity into an electrical signal to be processed and decoded into digital information. The preferred bar code is a matrix of one-dimensional bar codes shown in FIG. 6 that consists of rectangular elements 102A arranged in a symbol 102B. It is a one-dimensional bar code. The digital information in a symbol 102B is contained in the thickness and spacing of the elements 102A. In a preferred embodiment the symbols 102B in a row are sequentially rotated ninety degrees and each row is shifted 114.6 degrees to improve reading probability. The rotations and shifting are chosen to produce a high probability of a correct read for the minimum travel in any travel orientation. The encoding of digital information into one and two-dimensional bar codes is well known. A preferred encoding for symbol 102B is Code 128. Other embodiments include the Universal Product Code (UPS), Code 39, and Code 93.

In another embodiment a secondary camera (not shown) is used to image two-dimensional optical codes. A preferred two dimensional bar code is PDF417 designed by Symbol Technology. Other embodiments that use two-dimensional bar codes include MaxiCode used by United Parcel Service and Snowflake code from Electronic Automation Limited and Marconi Data Systems.

With the above disclosure in mind, the detector 30 not only detects speckles as disclosed above, but also functions as a one-dimensional bar code imager by outputting a signal strength that varies as the brightness of the aggregate of the speckles, since the IR-absorbing bar codes 102 reduce the brightness of the reflected laser illumination. The signal strength is calculated as the sum of the grayscale brightness of every pixel image in the detector 30, representing the integration of all light impinging on the detector 30. To speed processing, the window used for the above-mentioned bitwise correlation can also be used to measure signal strength, by summing the grayscale brightness of the pixels in the current frame subset. In another embodiment the bar code reader is a separate module (not shown) supported on the pen body 14, such as a bar code wand from Hewlett-Packard model HBCS-6300.

The bar code information is processed by the processor 22 and stored in memory 24 as a coarse absolute pen tip 28 position, with the above-described frame position logic being used to establish the precise pen position between the quarter inch intervals defined by the bar codes 102. Accordingly, the pen positions obtained at block 38 in FIG. 3, which otherwise are relative positions, can be transformed to absolute positions by using the bar coded paper substrate 100 shown in FIG. 6, i.e., the pen positions stored in memory 24 are not relative to each other but are relative to the substrate 12 on which the writer is writing. The handwriting recognition software that processes the handwriting after being captured by the pen device 10 receives the positions indicating handwriting strokes and the bar code 102 associated with the writing to digitally record the appropriate alpha-numeric characters in the appropriate locations of a computerized version of the substrate 100.

As mentioned above, a paper substrate can function as a form, with the invisible bar codes indicating not only position and page number but form field as well. In such an embodiment, the fields can be printed in visible ink on the paper for the user's convenience, as shown in FIG. 7. The form 104 shown in FIG. 7 includes various fields 106 for, e.g., name, address, etc. as labelled. The user can enter data into the fields 106, with the underlying bar codes (invisible and not shown) indicating to the device 10 that the pen tip 28 is writing in a particular field.

In a preferred embodiment, the contents of the memory 24 are downloaded to a computer which includes a field determination module. The field determination module uses position, page number, and prior knowledge of the field 106 location to associate handwriting with a computerized version of the substrate 100. The page number corresponds to a form number, preferably determined through a look-up table that also contains the location of the form field 106, stored as the lower left and upper right position of a rectangular box that bounds the field 106. Any handwriting that occurs within field boundary is assigned to the field.

Now referring to FIG. 8, yet another paper substrate 110 is shown with visible fields 111. Invisible bar codes cover the paper substrate 110 to indicate position and fields in accordance with the above disclosure. As shown in FIG. 8, categories are presented on the paper substrate 110, allowing the user to categorize writing during or after handwriting capturing. With this feature, a writer writes information onto a writing area 112 as convenient for the writer, and afterwards, which could be seconds, minutes or days, the writer marks up the writing, selecting a category and the corresponding writing, as described below.

Specifically, on, e.g., the left margin of the paper substrate 110 is a column of cells (a spreadsheet term for vertical boxes). Each cell contains a word or other visible icon that is recognizable by the writer. These words or icons are also referred to herein as "tags".

In one preferred embodiment, there are two types of words, namely, ACTION words including New, Undo, Done, Email, Fax, and CATEGORY words including Name, Address, Company, Subject, Drawing. When a writer underlines a CATEGORY cell such as name as shown in FIG. 8, an indicator light 114 on the pen device 10 can turn YELLOW, indicating that the next writing selected in the area 112 will be stored in the selected category. This is referred to as "tagging".

As shown in FIG. 8, one way to select writing in the area 112 is to underline the writing, as has been done in the case of the name "Tim Smith". Or, a box or circle can be drawn around the writing, or a horizontal line can be drawn to the left of the writing, and so on.

As understood herein, placing writing in categories facilitates search and reference. For example, the name field can searched for a particular name and writing that occurred nearby the tagged name (temporally or spatially near) can be displayed. Moreover, handwriting recognition is improved through the use of categories by limit the domain of possible words.

In one preferred embodiment, the listed categories definitions include:

User 1,2,3,4 are user defined categories;

Name, Company, Address, Phone #, Fax #, Day, Time, and Subject generally relate to faxes, email, business contacts, and appointments;

Call are people to call;

Drawing marks an area of paper that contains a drawing, e.g. sketch or map;

Expense typically are entries for expense reports, e.g. lunch $12.50;

Notes can be the body of a fax or email, memos;

Project can be the title of the project, the body of the writing can be untagged, or tagged as notes, drawing, etc.;

Order can be things to purchase or orders customers are requesting;

Personal can be all notes that are to be kept separate from work;

To Do are items that need to be done; and

Urgent flags writing that needs immediate attention. It can also be used to select email priority.

On the other hand, when an ACTION cell is underlined, the indicator light 114 can turn, e.g., GREEN for a few seconds. In one preferred embodiment, the listed ACTION definitions include:

New Indicates that writing to come is not associated with the previously selected writing;

Undo Undoes the last categorization;

Done Tells the handwriting recognition engine that entry of a fax or email is complete;

Email Sends Email. Either enter the email address or name for look up; and

Fax Sends Fax. Either the fax # or name is entered for look up.

When the contents of the memory 24 are downloaded to a computer, the computer interprets and acts on the ACTION words. For example, if the user underlined "Fax", "Phone #", and "Notes", the handwriting selected by the user would be faxed to the phone number specified by the user.

Figure 9:
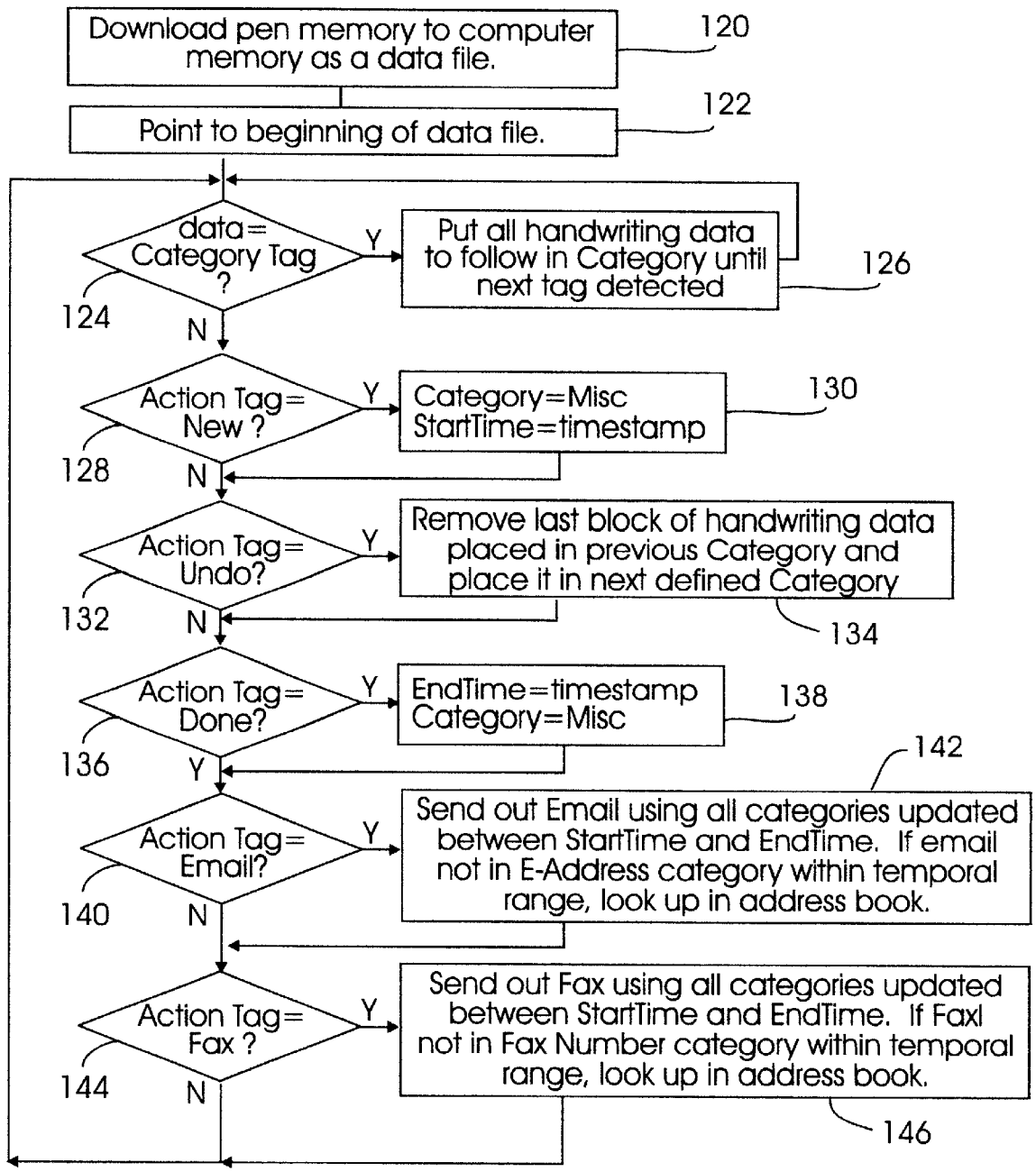
FIG. 9 is a flow chart of the tag processing logic.

FIG. 9 shows the logic of a preferred tag processing program, for example run on a personal computer. In a preferred embodiment, the pen microprocessor 22 time stamps handwriting and tag data as it is received and stores these time stamps into the pen memory 24. In block 120 the contents of the pen memory 24 is downloaded to the computer memory and stored as a data file. The data file is processed starting at the beginning, by resetting a file pointer in block 122. If the data is a category tag (decision diamond 124) all the subsequent handwriting data (including time stamps) is placed in the category specified by the tag (block 126) until a new tag is detected.

If the tag is the action tag New (decision diamond 128), a program variable StartTime is set to the most recent time stamp read from the data file (block 130). The category is set to a category called Misc where all untagged handwriting is stored. If the action tag is Undo (decision diamond 132), the user is indicating that they mis-categorized the previous information, so the previous block of handwriting is removed from the last category and placed in the next category specified by user, that is the next category that appears in the data file (block 134). If the action tag is Done (decision diamond 136), a program variable EndTime is set to the most recent time stamp read from the data file and the category is set to Misc (Block 138).

If the action tag is Email (decision diamond 140), an email is sent using all the categories that have been updated between the StartTime and EndTime. If an email address does not exist in E-Address category within the StartTime and EndTime time stamps, the email is searched in the user's address book (block 142). If the tag processing program can not find the email, it notifies the user that they tried to send an email to an unknown e-address.

If the action tag is Fax (decision diamond 144), a fax is sent using all the categories that have been updated between the StartTime and EndTime. If a fax number does not exist in Fax Number category within the StartTime and EndTime time stamps, the name is searched in the user's address book (block 142). If the tag processing program can not find the fax number, it notifies the user that they tried to send a fax to an unknown fax number.

While the particular DIGITAL PEN USING SPECKLE TRACKING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited. All structural and functional equivalents to the elements of the above-described preferred embodiment that are known to those of ordinary skill in the art are expressly incorporated herein by reference and are intended to be encompassed by the present claims.

We claim:

1. A system comprising:

at least one processor;

at least one substrate; and an elongated writing implement supporting the processor and receiving representation of the substrate as the writing implement is stroked across the substrate, the substrate including preprinted optical codes to provide position information and visible tags, the processor including logic for:

receiving a user selection of a tag representing at least one of: a writing category, and an action;

receiving a user selection of at least a portion of writing in a writing area distanced from the tag; and associating the selected portion of writing with the selected category or action.

2. The device of claim 1, further including tag processing means to categorize writing during or after handwriting capture.

3. The device of claim 2, wherein the processor includes logic for associating handwriting with at least one category of handwriting.

4. The device of claim 2, wherein the processor includes logic for associating handwriting with at least one action, the processor executing the action in the response to the associating act.

5. The device of claim 1, wherein the tags include at least one tag function or category chosen from the group including new, undo, done, email, fax, name, address, company, phone number, fax number, date, time, subject, drawing, call, expense, notes, project, order, personal, to do, and urgent.

6. The device of claim 5, wherein tag processing means includes logical means to cause fax or email transmissions of categorized handwriting.

7. A system comprising:

at least one processor;

at least one substrate; and an elongated writing implement supporting the processor and receiving representations of at least one position code on the substrate as the writing implement is stroked across the substrate, the substrate including preprinted optical codes to provide position information and visible tags, the processor allowing a user to associate handwriting on the substrate with at least one handwriting category indicated by at least one tag at a period subsequent to stroking the writing implement across the substrate.

8. The device of claims 7, further including tag processing means to categorize writing during or after handwriting capture.

9. The device of claim 7, wherein the tags include at least one tag function and category chosen from the group including new, undo, done, email, fax, name, address, company, phone number, fax number, day, time, subject, drawing, call, expense, notes, project, order, personal, to do, and urgent.

10. The device of claim 9, wherein tag processing means includes logical means to cause fax or email transmissions of categorized handwriting.

11. A system, comprising:
   at least one substrate having visible category and action fields; and
   at least one digital input pen strokable across at least a writing area of the substrate that is distanced from the visible fields, the pen including at least one processor, the processor executing logic for:
      allowing a user of the pen to categorize writing at least after handwriting, whereby a user can write information onto a writing area and afterward correlate the writing at least with one of: a category, and an action.

12. The system of claim 11, wherein the substrate bears invisible bar codes, the bar codes indicating at least position.

13. The system of claim 11, wherein the category includes at least one of: Name, Address, Company, Subject, Drawing.

14. The system of claim 11, wherein the action includes at least one of: New, Undo, Done, Email, Fax.

* * * * *